United States Patent
Spielmann et al.

(10) Patent No.: US 7,260,549 B2
(45) Date of Patent: *Aug. 21, 2007

(54) METHOD AND SYSTEM FOR MANAGING RISK

(75) Inventors: Craig Spielmann, Montclair, NJ (US); Maria Hutter, Princeton Junction, NJ (US); Joel Klein, Croton, NY (US); Naresh Singhani, Paramus, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,316

(22) Filed: May 12, 2006

(65) Prior Publication Data

US 2006/0277083 A1 Dec. 7, 2006

Related U.S. Application Data

(63) Continuation of application No. 09/545,381, filed on Apr. 7, 2000, now Pat. No. 7,113,914.

(51) Int. Cl.
*G06F 17/30* (2006.01)
(52) U.S. Cl. .......................... 705/7; 705/11
(58) Field of Classification Search ................ 705/7, 705/11
See application file for complete search history.

(56) References Cited

U.S. PATENT DOCUMENTS

| | | | |
|---|---|---|---|
| 3,634,669 A | 1/1972 | Soumas et al. | |
| 4,465,206 A | 8/1984 | Sorel et al. | |
| 4,582,985 A | 4/1986 | Lofberg | |
| 4,614,861 A | 9/1986 | Pavlov et al. | |

(Continued)

FOREIGN PATENT DOCUMENTS

CA 2293321 6/1998

(Continued)

OTHER PUBLICATIONS

"Compliance: An Exercise in Risk Management", www.bankersonlince.com, 1996, pp. 1-2, retrieved from: Google.com.*

(Continued)

*Primary Examiner*—Tariq R. Hafiz
*Assistant Examiner*—B. Van Doren
(74) *Attorney, Agent, or Firm*—Lowenstein Sandler PC

(57) ABSTRACT

A data processing system and method of using said data processing system for assessing and managing risk is disclosed. The preferred embodiment of the method includes the steps of identifying a set of risk elements; determining an importance for each said risk element; identifying any subrisks associated with said risk elements; identifying one or more control procedures for each said subrisk element; assigning weights to each said control procedure; rating compliance with each said control procedure and calculating an overall weighed compliance score. The method may further include the steps of for each non-fully compliant subrisk, allowing the user to determine whether to accept the risk or generate an action plan addressing the risk. The method may further preferably include calculating future compliance scores based on said action plans. The system further provides for sorting and displaying compliance scores by a number of parameters.

13 Claims, 10 Drawing Sheets

U.S. PATENT DOCUMENTS

| | | |
|---|---|---|
| 4,634,845 A | 1/1987 | Hale et al. |
| 4,689,478 A | 8/1987 | Hale et al. |
| 4,700,055 A | 10/1987 | Kashkashian, Jr. |
| 4,746,787 A | 5/1988 | Suto et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,526 A | 5/1989 | Luchs |
| 4,837,422 A | 6/1989 | Dethloff et al. |
| 4,868,376 A | 9/1989 | Lessin et al. |
| 4,870,259 A | 9/1989 | Boggan et al. |
| 4,882,675 A | 11/1989 | Nichtberger et al. |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasegawa |
| 5,080,748 A | 1/1992 | Bonomi |
| 5,146,068 A | 9/1992 | Ugawa et al. |
| 5,180,901 A | 1/1993 | Hiramatsu |
| 5,202,286 A | 4/1993 | Nakatani |
| 5,206,488 A | 4/1993 | Teicher |
| 5,206,803 A | 4/1993 | Vitagliano et al. |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,365,575 A | 11/1994 | Katz |
| 5,383,113 A | 1/1995 | Knight et al. |
| 5,399,502 A | 3/1995 | Friend et al. |
| 5,401,827 A | 3/1995 | Holmes et al. |
| RE34,915 E | 4/1995 | Nichtberger et al. |
| 5,453,601 A | 9/1995 | Rosen |
| 5,455,407 A | 10/1995 | Rosen |
| 5,459,306 A | 10/1995 | Stein et al. |
| 5,466,919 A | 11/1995 | Hovakimian |
| 5,477,040 A | 12/1995 | Lalonde |
| 5,479,494 A | 12/1995 | Clitherow |
| 5,483,444 A | 1/1996 | Heintzeman et al. |
| 5,483,445 A | 1/1996 | Pickering |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,581,064 A | 12/1996 | Riley et al. |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | McKoy et al. |
| 5,621,812 A | 4/1997 | Deaton et al. |
| 5,638,457 A | 6/1997 | Deaton et al. |
| 5,642,279 A | 6/1997 | Bloomberg et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto et al. |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A * | 3/1998 | Sturgeon et al. ............... 705/9 |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,749,075 A | 5/1998 | Toader et al. |
| 5,760,381 A | 6/1998 | Stich et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,789,733 A | 8/1998 | Jachimowicz et al. |
| 5,794,207 A | 8/1998 | Walker et al. |
| 5,798,950 A * | 8/1998 | Fitzgerald ................... 703/17 |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge et al. |
| 5,807,627 A | 9/1998 | Friend et al. |
| 5,809,478 A | 9/1998 | Greco |
| 5,815,657 A | 9/1998 | Williams et al. |

| Patent No. | Date | Inventor(s) |
|---|---|---|
| 5,815,658 A | 9/1998 | Kuriyama |
| 5,819,234 A | 10/1998 | Slavin et al. |
| 5,819,237 A | 10/1998 | Garman |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,718 A | 2/1999 | Spector |
| 5,870,721 A | 2/1999 | Norris |
| 5,875,437 A | 2/1999 | Atkins |
| 5,883,377 A | 3/1999 | Chapin, Jr. |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,905,246 A | 5/1999 | Fajkowski |
| 5,907,350 A | 5/1999 | Nemirofsky |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,930,217 A | 7/1999 | Kayanuma |
| 5,930,762 A * | 7/1999 | Masch .......................... 705/7 |
| 5,931,764 A | 8/1999 | Freeman et al. |
| 5,933,817 A | 8/1999 | Hucal |
| 5,937,068 A | 8/1999 | Audebert |
| 5,940,811 A | 8/1999 | Norris |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,956,695 A | 9/1999 | Carrithers et al. |
| 5,963,648 A | 10/1999 | Rosen |
| 5,970,479 A | 10/1999 | Shepherd |
| 5,974,399 A | 10/1999 | Giuliani et al. |
| RE36,365 E | 11/1999 | Levine et al. |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,743 A * | 11/1999 | Irving et al. .............. 705/36 R |
| 5,991,748 A | 11/1999 | Taskett |
| 5,991,750 A | 11/1999 | Watson |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |
| 6,004,681 A | 12/1999 | Epstein et al. |
| 6,006,988 A | 12/1999 | Behrmann et al. |
| 6,009,415 A | 12/1999 | Shurling et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,019,284 A | 2/2000 | Freeman et al. |
| 6,026,370 A | 2/2000 | Jermyn |
| 6,029,139 A | 2/2000 | Cunningham et al. |
| 6,029,144 A * | 2/2000 | Barrett et al. .................. 705/30 |
| 6,029,890 A | 2/2000 | Austin |
| 6,032,136 A | 2/2000 | Brake, Jr. et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,045,042 A | 4/2000 | Ohno |
| 6,047,067 A | 4/2000 | Rosen |
| 6,047,268 A | 4/2000 | Bartoli et al. |
| 6,049,463 A | 4/2000 | O'Malley et al. |
| 6,049,773 A | 4/2000 | McCormack et al. |
| 6,049,782 A | 4/2000 | Gottesman et al. |
| 6,058,378 A | 5/2000 | Clark et al. |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,091,817 A | 7/2000 | Bertina et al. |
| 6,092,056 A | 7/2000 | Tull, Jr. et al. |
| 6,095,412 A | 8/2000 | Bertina et al. |
| 6,095,416 A | 8/2000 | Grant et al. |
| 6,098,053 A | 8/2000 | Slater |
| 6,105,011 A | 8/2000 | Morrison, Jr. |
| 6,115,458 A | 9/2000 | Taskett |
| 6,119,097 A * | 9/2000 | Ibarra .......................... 705/11 |
| 6,119,932 A | 9/2000 | Maloney et al. |
| 6,122,623 A | 9/2000 | Garman |
| 6,128,598 A | 10/2000 | Walker et al. |
| 6,129,274 A | 10/2000 | Suzuki |
| 6,134,536 A | 10/2000 | Shepherd |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,195,644 B1 | 2/2001 | Bowie |
| 6,202,053 B1 | 3/2001 | Christiansen et al. |
| RE37,122 E | 4/2001 | Levine et al. |
| 6,223,143 B1 * | 4/2001 | Weinstock et al. ............ 703/17 |
| 6,227,447 B1 | 5/2001 | Campisano |
| 6,263,316 B1 | 7/2001 | Khan et al. |
| 6,265,977 B1 | 7/2001 | Vega et al. |
| 6,278,981 B1 | 8/2001 | Dembo et al. |
| 6,295,522 B1 | 9/2001 | Boesch |
| 6,298,336 B1 | 10/2001 | Davis et al. |
| 6,308,268 B1 | 10/2001 | Audebert |
| 6,336,099 B1 | 1/2002 | Barnett et al. |
| 6,341,724 B2 | 1/2002 | Campisano |
| 6,343,743 B1 | 2/2002 | Lamla |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |

| | | |
|---|---|---|
| 6,377,669 B1 | 4/2002 | Walker et al. |
| 6,385,591 B1 | 5/2002 | Mankoff |
| 6,386,444 B1 | 5/2002 | Sullivan |
| 6,397,202 B1* | 5/2002 | Higgins et al. ............... 706/47 |
| 6,402,039 B1 | 6/2002 | Freeman et al. |
| 6,405,179 B1* | 6/2002 | Rebane ..................... 705/36 R |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1* | 12/2003 | Baseman et al. ............... 705/7 |
| 6,675,127 B2 | 1/2004 | LaBlanc et al. |
| 6,675,149 B1* | 1/2004 | Ruffin et al. ................... 705/8 |
| 6,687,222 B1 | 2/2004 | Albert et al. |
| 6,693,544 B1 | 2/2004 | Hebbecker |
| 6,742,704 B2 | 6/2004 | Fitzmaurice et al. |
| 6,745,938 B2 | 6/2004 | Sullivan |
| 6,802,008 B1 | 10/2004 | Okada et al. |
| 6,805,287 B2 | 10/2004 | Bishop |
| 6,865,547 B1 | 3/2005 | Brake, Jr. et al. |
| 6,868,426 B1 | 3/2005 | Mankoff |
| 6,876,971 B1 | 4/2005 | Burke |
| 6,901,372 B1 | 5/2005 | Helzerman |
| 6,912,502 B1* | 6/2005 | Buddle et al. ................. 705/1 |
| 7,006,992 B1* | 2/2006 | Packwood .................... 705/38 |
| 2001/0011227 A1 | 8/2001 | Ashery et al. |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1* | 8/2002 | Fetherston ................ 707/500 |
| 2002/0143703 A1 | 10/2002 | Razvan et al. |
| 2002/0147662 A1 | 10/2002 | Anderson |
| 2002/0165820 A1 | 11/2002 | Anvekar et al. |
| 2002/0174016 A1 | 11/2002 | Cuervo |
| 2003/0004828 A1 | 1/2003 | Epstein |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0101119 A1 | 5/2003 | Persons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0216965 A1 | 11/2003 | Libman |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0098351 A1 | 5/2004 | Duke |
| 2004/0243498 A1 | 12/2004 | Duke |
| 2005/0021400 A1 | 1/2005 | Postrel |
| 2005/0071230 A1 | 3/2005 | Mankoff |
| 2005/0075932 A1 | 4/2005 | Mankoff |
| 2005/0091138 A1 | 4/2005 | Awatsu |
| 2005/0171898 A1 | 8/2005 | Bishop et al. |

FOREIGN PATENT DOCUMENTS

| | | |
|---|---|---|
| EP | 0959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO94/29112 | 12/1994 |
| WO | WO97/41673 | 11/1997 |
| WO | WO 98/59307 | 12/1998 |
| WO | WO98/59307 * | 12/1998 |
| WO | WO99/05633 | 2/1999 |
| WO | WO 01/18699 | 3/2001 |
| WO | WO 01/69347 A3 | 9/2001 |
| WO | WO 2005/043277 A3 | 5/2005 |

OTHER PUBLICATIONS

5500—FDIC General Counsel's Opinion No. 8-Stored Value Cards, 61 FED. Reg. 40490, http://www.fdic.gov/regulations/laws/rules/5500-500.html, Aug. 2, 1996.

A Store Card Issuer Looks for Lift from Electronic Gift Certificates, Credit Card News, Feb. 1, 1995, 2 pages.

Associates First Capital Corporation, Hoover's Inc., The Industry Standard: The Newsmagazine of the Internet Economy, The Standard.Net/Companies/Company-Display, Apr. 6, 1999.

Award Card Comparison, JA7922.

Bank; Cash, Check, Charge—What's Next?, Seattle Times, Mar. 6, 1995.

Blockbuster Running Test of a Stored Value Card, The American Banker, Sep. 1, 1995.

Boatmen's Floats Stored Value into the Employee Incentive Waters, Debit Card News, vol. 2, Issue 2, Jul. 16, 1996, 3 pages.

Bogle; Mutual Funds at the Millennium: Fund Directors and Fund Myths, The Vanguard Group to the '40 Act Institute of PLI (Practicing Law Institute), New York, NY, May 15, 2000, 15 pages.

Brehl; Banks Issue Cash-Card Pledge, The Toronto Star, Oct. 9, 1997, 1 page.

Britt; Competing in Auto Lending, America's Community Banker, vol. 5, No. 11, Nov. 1, 1996, pp. 33-37.

Brown et al.; Purchasing Card Magic: Eli Lilly Finds Accounts Payable Flying High with Plastic, Corporate Cashflow, vol. 15, No. 12, Nov. 1994, 2 pages.
Business Times; Electronic Purse can Free you from ATM Drag, Business Times, www.btimes.co.za, printed Feb. 23, 2001, 1 page.
Card Based Award Systems, JA8309.
Cardex Incentives, www.cardex.com, Apr. 6, 1999.
Cardflash, Apr. 5, 2005.
CES/Nabanco Introduces Stored Value Card Technology Blockbuster Video is First Merchant Partner, Business Wire, Inc., Jan. 15, 1996.
Clark; Microsoft, Visa to Jointly Develop PC Electronic-Shopping Software, the Wall Street Journal, Nov. 9, 1994, WSJ B9.
Common Electronic Purse Specifications, Business Requirements, Version 6.0, Dec. 1998.
Consortium Created To Manage Common Electronic Purse Spectification, Cardtech Securtech, Chicago, www.visa.com/av/news/prmisc051199.vhtml, May 11, 1999.
Coulton; Incentives Field Moving to Card-Based Series 14, American Banker, Mar. 26, 1998, 3 pages.
D.C. Area Safeway Stores Look for Increase in Sales Volume and Revenue with Cards, Card News, vol. 6, No. 25, Dec. 30, 1991, pp. 7-9.
Dugas; Payroll May Ask: Paper or Plastic?, USA Today, 3B, Aug. 14, 2001, 1 page.
Edwards; ATMS the Hot New Media Buy, ABA Banking Journal, Mar. 1999, pp. 58, 60.
Electronic Purse Card to be Launched Tomorrow, New Straits Times, News Clipping, Sep. 18, 1999, printed Feb. 23, 2001, 3 pages.
Electronic Purse, SCIA (Smart Card Industry Association), About Smart Cards, www.scia.org, printed Feb. 23, 2001, 1 page.
E-Z Pass, Web Page, http://www.EZPass.com-disc_portnewyork.html, Nov. 12, 2001.
E-Z Pass, Web Page, http:\\www.ezpass.com-disc_ny_annual.html, Nov. 12, 2001.
E-Z Pass, Web Page, http:\\www.ezpass.com-framemain.html, Nov. 12, 2001.
E-Z Pass, Web Page, http:\\www.ezpass.com-whatis.html, Nov. 12, 2001.
Fickenscher; Amex Prepaid Offering is Latest Card for Firms Regarding Employees, American Banker, vol. 161, No. 151, Aug. 8, 1996, pp. 1-2.
First Data Markets Stored-Value Cards, Cards International, Jan. 30, 1996, p. 5.
First Union Issues Smart Cards to Fort Benning Recruits, Cardfax, vol. 1999, No. 60, Mar. 26, 1999, 1 page.
First USA—Activate Today and Get One Hour Free Calling Card Calls, Call 1-800-555-2535, First USA, 6 Pages.
First USA—Call 1(800)335-2453 to Receive One Free Hour of Domestic Long Distance Calling (No Strings Attached), First USA, 6 Pages.
First USA Platinum Connect, First USA Bank, First USA Promotional Mailing, Oct. 1997, 6 Pages.
Frequently Asked Questions, Ecard, www.eregard.com, Printed Sep. 23, 2001, 7 Pages.
Glossman, et al.,; Glossman, et al., Citicorp- Company Report.
Guidotti; Comparing Environmental Risks: A Consultative Approach to Setting Priorities at the Community Level, Public Health Rev 1994, vol. 22, Jun. 16, 2005, pp. 321-337.
Hansell; Visa to Unveil Electronic Purse Cards, New York Times, Printed Feb. 23, 2001, 2 Pages.
Here's the Calling Convenience you asked for: 1-800-CALL-ATT . . . for all Calls, AT&T, Appendix A: for Card Carriers, 1999, 7 Pages.
Hoovers, General Mills, Inc. Corporate Profile Relied Upon to Show the History of the Company, http://cobrnads.hoovers.com/global/cobrands/proquest/history.xhtml?coid=10639, Jul. 12, 2005, 2 Pages.
Hotchkiss; ATM's at the Head of Their Class, Bank Marketing, vol. 29, No. 3, Mar. 1997, pp. 26-32.
How is it Different?, JA8331.
Incenticard, Bellsouth, JA8329.

Introducing Spendingmoney(TM), Armetta: Marketing & Design Product Concept Report, Oct. 9, 1996, 15 Pages.
Introducing the First USA Platinum Connect Card, First USA Promotional Mailing, Dec. 1997, 2 Pages.
Key Bank Holiday Offer, http://www.key.com/swiftgift/home.html, Printed Apr. 5, 1999.
Konrad; IBM had a Bunch of Unusual Ideas in 2003, www.philly.com, Printed Jan. 21, 2004, Posted on Jan. 13, 2004, 2 Pages.
Kutler; Cash Card Creator Looking Beyond Mondex, Feb. 9, 1995.
Lacker; Stored Value Cards: Costly Private Substitutions for Government Currency, Economic Quarterly, 1996, Economic Quarterly, V82, N3, P1(25), ISSN: 1069-7225, 17 Pages.
Lamond; Credit Card Transactions Real World and Online, Paying by Credit Card-Real World and Online, http://www.virtualschool.edu/mon/electronicproperty/klamond/credit, Printed Jul. 8, 2005, 17 Pages.
Langheinrich et al.; Unintrusive Customization Techniques for Web Advertising, Computer Networks, vol. 31, 1999, pp. 1259-1272.
Lazarony: Stuck for a Gift? Give a Prepaid Credit Card, www.bankrate.com, Dec. 21, 1998, 1 Page.
Machlis et al.; Will Smart Cards Replace ATMS?, Computerworld, Printed Feb. 23, 2001, 3 Pages.
Machlis; Have it the Smart Way: Burger King Program Drives Smart-Card USe, Computerworld, Printed Feb. 23, 2001, 1 Page.
Mailfrontier Survey Finds That Consumers Hold Financial Institutions Accountable for Online Identitiy Theft, www.mailfrontier.com, Palo Alto, CA, Nov. 2004.
Meece; Boatman's Prepaid Cards for Worker-Incentive Firm, American Banker, Jul. 2, 1996, p. 12.
Meridian Award Cards, JA8251.
Meridian Interoffice Memo, Meridicard Enhancement-Floating Credit Limit, JA8354-JA8355, Aug. 2, 1989.
Meridian-the Leader in Card Marketing, JA8343.
Meridicard vs. Debit Cards, JA7917.
Miller; Section E.2.1: Kerberos Authentication and Authorization System, Project Athena, Cambridge, MA, Dec. 21, 1987, 39 Pages.
Mobasher et al.; Creating Adaptive Web Sites Through Usage-Based Clustering of Urls, Knowledge and Data Engineering Exchange Workshop, Chicago, IL and Los Alamitos, CA, 1999, pp. 19-25.
More Retailers Turn to Co-Branding, Chain Store Age Executive with Shopping Center Age, Feb. 1, 1995, 3 Pages.
Morgan et al.; Categorizing Risks for Risk Ranking, vol. 20, No. 1, Jun. 22, 2005, pp. 49-58.
Neumann; An Enhanced Neural Network Technique for Software Risk Analysis, IEEE Transactions on Software Engineering, vol. 28, No. 9, Sep. 1, 2002, pp. 904-912.
New 1-800-Call-ATT Campaign Promotes One Number for Calls, AT&T Marketing, News Release, www.att.com/press/0297/970217.csa.htm, Feb. 17, 1997, 2 Pages.
Norris; First Data Unit Develops Blockbuster Cash Card, Omaha World Hearld Sunrise Edition, Business Section, Jan. 19, 1996, p. 16.
O'Connor; Maritz Gets Mastercard's Stamp of Approval, Business Travel News, Aug. 19, 1996, 2 Pages.
Piskora; Debit Cards Seen Poised for New Markets, American Banker, Credit/Debit/ATMS, Mar. 7, 1995, p. 16.
Proton World and Europay to Co-Operative in Creation of New CEPS-Compliant E-Purse Application, Press Release 1999, Waterloo, Belgium, Jun. 28, 1999, 2 Pages.
Purse Application for Cross Border Use in Euro, Codis, Pace 1st 1999-11531 Pace, www.cordis.lu, Printed Feb. 23, 2001, 3 Pages.
Rosen; Cash Just Isn't Flexible Enough: Shops of the Future Will Only Take Cards, Daily Express, Technology Section, Feb. 10, 1995, 1 Page.
Sanchez-Klein; Electronic Purse Alliance Planned, Computerworld Online News, Jul. 29, 1998, Printed Feb. 23, 2001, 2 Pages.
Schwab, Charles: Now 7 Ways for a Better Total Return for Your Money; Schwat 1, the Inventor's Asset Management Account, Charles R. Schwab, Charles Schwab & Co., Inc., 16 Pages.
SK100 Smart Card Electronic Purse Balance Reader, SK100 Balance Reader, http://perso.wanadoo.fr, Printed Feb. 23, 2001, 1 Page.

Smart Card for Loyalty and E-Purse Applications Eclipses Capability of Conventional Mag-Stripe Cards, Press Release, www.1.sib.com, Apr. 21, 1997, Printed Feb. 23, 2001, 3 Pages.

Smart Cards: Big Brother's Little Helpers, The Privacy Committee of New South Wales, No. 66, Aug. 1995.

Smartaxis: Load Cash on to Your-E-Purse Card, Supported Currencies and Schemes, www.smartaxis.co.uk, Printed Feb. 23, 2001, 9 Pages.

Song; A Card That Asks for ID, Time Magazine, Apr. 12, 2004, 1 Page.

Souccar; Smart Cards: 1st Union Smart Card Pilot Enlists a Second Army Base, American Banker, Digital Frontiers, vol. 164, No. 61, Mar. 31, 1999, 3 Pages.

Spurgin; Sopininmon! or What's Happening in the Retail Credit Card Environment, Credit World Journal, vol. 85, No. 4, Mar. 1, 1997, pp. 20-23.

Stoughton; The Gift of Credit, www.washingtonpost.com/wp-srv/business, Dec. 4, 1998.

Stuber; The Electronic Purse: An Overview of Recent Development and Issues, Bank of Canada, Technical Report No. 74, www.bankofcanada.ca, Jan. 1996, Printed Feb. 23, 2001, 2 Pages.

Swiftgift; Welcome to Swiftgift, www.swiftgiftcard.com, Dec. 8, 1998, 10 Pages.

The Campus Card Conundrum, Card Technology, Journal ISSN: 1093-1279, p. 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

Understanding the Benefits: Smartcity Offers a Number of Important Benefits to Both the Card Issuers and Their Customers, http://www.icl.com/smartcards/benefits.htm, Printed Feb. 27, 2001, 2 Pages.

Universal Card Free Lifetime Membership Extended 3 Months, AT&T Marketing, www.att.com/press/0297/970217.csa.html, Dec. 4, 1990, 2 Pages.

Vandenengel; Cards on the Internet; Advertising on a $3 Bill, Industry Intelligence, Feb. 1, 1995, pp. 46-48.

Visa Cash—Where Can I Get It?, www.visa-asia.com/pd/cash/where.html, Feb. 23, 2001.

Visa Cash, www.visa-asia.com/pd/cash/main.html, Feb. 23, 2001.

Visa First to Launch Electronic Purse Load via GSM Mobile Phone, www.cellular.co.za, Johannesburg, ZA, Printed Feb. 23, 2001, 4 Pages.

Visa International and Sermepa Announce Plans for Cross Border Visa Cash Based on CEPS, www.visa.com/av/news/praaamisc111699.vhtml, Nov. 16, 1999.

Visa Releases Visa Cash Electronic Purse Specifications Based on CEPS, www.visa.com/av/news/praamisc042099.vhtml, San Francisco, Apr. 20, 1999.

Welcome to Card Express Cardex, Cardex Website Archived by Web.Archive on Oct. 31, 1996, http://web.archive.org/web/*/http://www.cardex.com, Retrieve Oct. 18, 2003, 7 Pages.

Welcome to Card Express, the Cardex Incentive Card, as Disclosed in the Cardex Web Site Archived by web.archive.org on Feb. 7, 1998, http://web.archive.org/web/*/http://www.cardex.com, Retrieve Oct. 18, 2003, 8 Pages.

* cited by examiner

| Assessments | Scope | Risk Assessment | Risk Detail | Action Plan | Submit |

Voice / Trader Voice / Hong Kong

| Risk Name | Subrisk Name | Gap Name | Control Procedure | Action Plan Status | Rating |
|---|---|---|---|---|---|
| Business Continuity | Bus. Resum. | A plan exists but is not as co | Off-site Recovability | Action Plan Created | Yellow |
| Business Continuity | Bus. Resum. | The last test was conducted | System Testing | Action Plan Created | Yellow |
| Business Continuity | Bus. Resum. | During the last test we had si | Test Performance | Action Plan Created | |
| Business Continuity | Bus. Resum. | During the last test we had si | Test Performance | Action Plan Created | |

◎ Create Action Plan  ○ Accept Ris — 501

Status: Open — 504

Task Search

Description: Business Continuity Pl — 502

Target Date: 12/15/1999 — 503

Action Plan: We will revise the current plan to include more detail such as - people

JOEL  KLEIN  80 — 506

Est. Cost: $5000 — 505

Save  Next  Delete

FIG. 5

METHOD AND SYSTEM FOR MANAGING RISK

CROSS-REFERENCE TO RELATED APPLICATION

This application is a continuation of U.S. application Ser. No. 09/545,381, filed on Apr. 7, 2000, now U.S. Pat. No. 7,113,914 the entire disclosure of which is hereby incorporated by reference herein.

FIELD OF INVENTION

The present invention relates to a method and system for managing risks inherent in business activities and more particularly to a data processing apparatus and method for identifying, managing and quantifying risks and associated control procedures.

BACKGROUND OF THE INVENTION

Many organizations worldwide have developed practices for internal control. The Institute of Internal Auditors' ("IIA") Standards for the Professional Practice of Internal Auditing (Standards) defines control as:

. . . any action taken by management to enhance the likelihood that established objectives and goals will be achieved. Management plans, organizes, and directs the performance of sufficient actions to provide reasonable assurance that objectives and goals will be achieved. (Section 300.06)

According to Specific Standard 300.05, the primary objectives of internal control are to ensure:
1. the reliability and integrity of information;
2. compliance with policies, plans, procedures, laws, regulations, and contracts;
3. the safeguarding of assets;
4. the economical and efficient use of resources;
5. the accomplishment of established objectives and goals for operations or programs.

Many organizations have recognized the need for tracking the effectiveness of internal control practices. For example, according to the IIA's Professional Practices Pamphlet 97-2, Assessing and Reporting on Internal Control, the IIA supports the Committee of Sponsoring Organizations of the Treadway Commission, recommendation that organizations should report on the effectiveness and efficiency of the system of internal control.

One system of internal control, the Control Self-Assessment (CSA) methodology, was initially developed in approximately 1987 and is used by many organizations to review key business objectives, risks involved in achieving objectives, and internal controls designed to manage those risks. The IIA states that some CSA proponents have expanded this description to encompass potential opportunities as well as risks, strengths as well as weaknesses, and the overall effectiveness of the system in ensuring that the organization's objectives are met.

CSA approaches and formats may differ from one organization to another, however, the three primary CSA approaches are: facilitated team meetings (also known as workshops), questionnaires and management-produced analysis. Organizations may combine more than one approach. Facilitated team meetings gather internal control information from work teams that may represent multiple levels within an organization. The questionnaire approach uses a survey instrument that offers opportunities for simple yes/no or have/have not responses. Management-produced analysis is any approach that does not use a facilitated meeting or survey.

While existing methodologies and systems, such as the CSA, offer some structure in approaching the control of risk, to date, no system or methodology known to the applicants exists that properly quantities risks and the effectiveness of control procedures designed to address such risks. For example, many existing systems rely on a single weak link approach, without consideration of the significance of such link. If an assessor utilizing the weak link approach identifies a large number of processes associated with a risk element (e.g. business continuity), the presence of a single non-complaint process would red-flag the entire risk element, regardless of the significance of the non-complaint process. Thus, existing systems provide no mechanism for comparing results over time, nor are they reliable for providing a meaningful index of how well individual entities are measuring risk.

The method and system of the present invention addresses these and other limitations by utilizing a quantitative weighted approach to evaluating risk. A three-tiered approach to evaluate risk is preferably used, dividing the system into: "Risks", "Subrisks," and "Control Procedures." An assessor is prompted through a series of screens to rate risks as "High," "Medium" and "Low." At the next level (the "Subrisk" level), a set of control procedures is provided. Each control procedure is rated by the assessor according to a number of categories, such as GREEN (full compliance), YELLOW (partial compliance), RED (non-compliance), or BLUE (not applicable). Control Procedures are assigned different weights because some risks are more critical than others. For items which are not fully compliant (e.g. items rated either YELLOW (partial compliance) or RED (non-compliance)), the assessor must either indicate that the risk is acceptable or create an action plan where deliverables are identified and target dates are established.

The system further provides a method of weighing, sorting and graphing displays which allows management to more easily identify significant areas of risk. This allows assessors to sort and view data in a number always, such as toy organization, business line, city and process. The display system further allows the user to "drill down" by clicking on high risk areas facilitating the identification of specific assessments which are having a significant impact on the risk rating.

Targets are derived from the Action Plans. A target is an index or measure which informs management of progress against action plans. Targets and actual results will be compared from quarter to quarter, to determine whether appropriate progress is being made against commitments.

BRIEF DESCRIPTION OF THE FIGURES

These and other aspects of the present invention are more apparent in the following detailed description and claims, particularly when considered in conjunction with the accompanying drawings showing a system constructed in accordance with the present invention, in which:

FIG. 5 is an exemplary computer display for accepting risks or entering action plans;

DETAILED DESCRIPTION OF THE INVENTION

Figure 1:
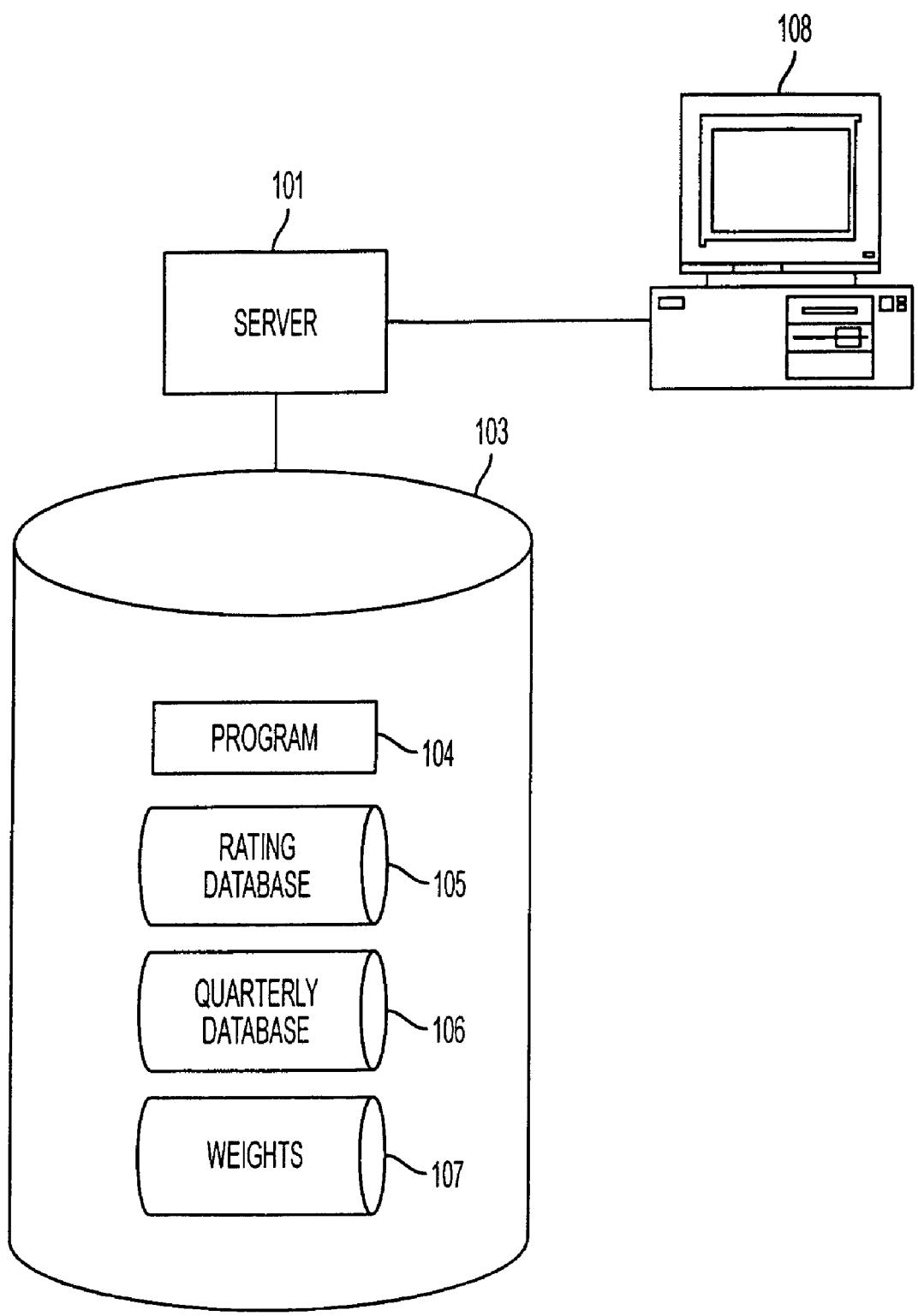
FIG. 1 is a system diagram showing the components of an exemplary system implementing the present invention.

FIG. 1 depicts the components of an exemplary computing system implementing the inventive system for managing risk. Server 101 includes one or more communications ports 109 for communicating with assessors utilizing client workstations 108. Server 101 is coupled to one or more storage devices 103. Storage device(s) 103 include an executable or interpretable program 104 for controlling the management system. Storage device(s) 103 also include a rating database 105 containing data elements necessary for the rating process, and a quarterly assessment database 106 containing data elements necessary for quarterly assessments.

Figure 2:
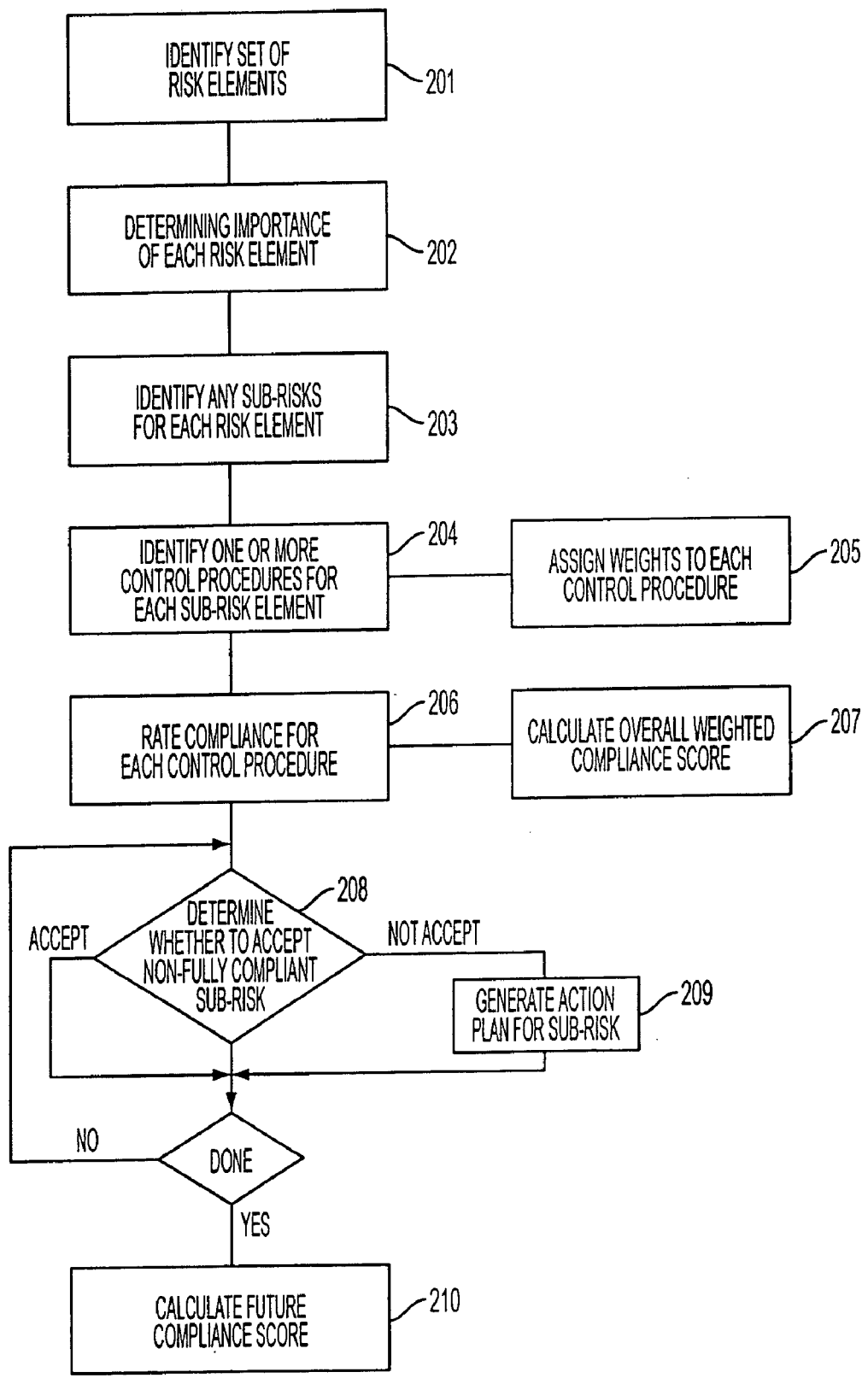
FIG. 2 is a logic diagram showing a preferred embodiment of the risk management system of the present invention.
Figure 3:
FIG. 3 is an exemplary computer display for rating the importance of a set of risk elements.

FIG. 2 presents an overview of the inventive process of categorizing, weighing and tracking risks. Initially, a set of risk elements are identified 201. The following are exemplary risks in the field of investment management. (i) business continuity, (ii) financial, (ii) information, (iv) legal/regulatory, (v) people, (vi) physical security, and (vii) technology, however the set of risk elements will vary from application to application. Each risk is rated 202 preferably according to a fixed set of criteria. In the preferred embodiment of the invention these criteria comprise the probability of occurrence and the impact to the business should the situation occur. Each risk is also preferably rated by a fixed set of rankings, such as "High," "Medium" and "Low." FIG. 3 is an exemplary computer display showing the rating 301 of risk elements 302 as High, Medium or Low. Each of these ratings 301 is stored in rating database 105 with the associated risk elements 302. Although not used in the preferred embodiment of this invention, these criteria and rankings may optionally be used in the weighing formula discussed below.

Figure 4:
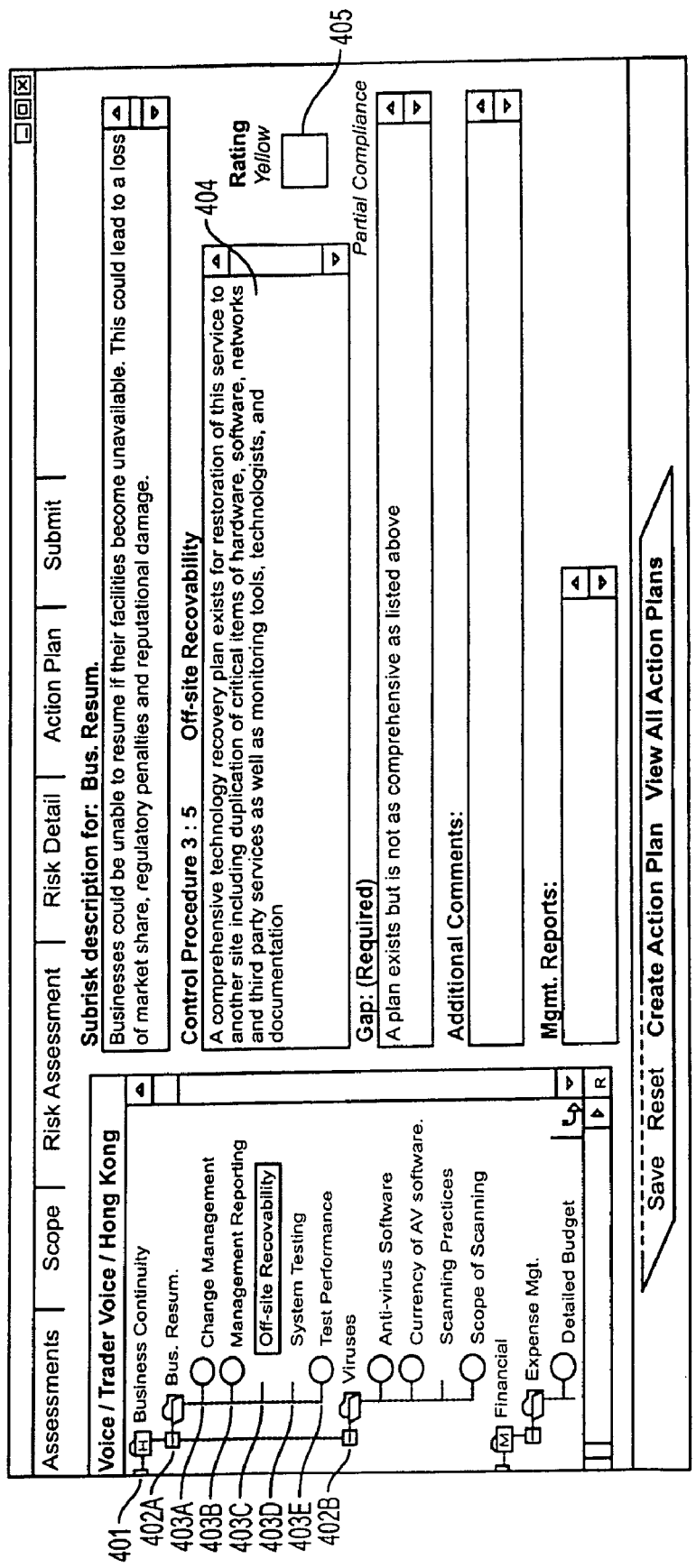
FIG. 4 is an exemplary computer display showing subrisks, control procedures, compliance ratings and an action plan for non-fully complaint risks.

Each subrisk of the risk elements is identified 203 and presented to the user. In the preferred embodiment, these subrisks comprise:
1. Business Resumption:
   (i) Business Resumption; and
   (ii) Viruses.
2. Financial:
   (i) Expense Management.
3. Information:
   (i) Restoration; and
   (ii) Security.
4. Legal/Regulatory:
   (i) Vendor Management; and
   (ii) Software Licensing.
5. People:
   (i) Capabilities; and
   (ii) Compliance.
6. Physical Security:
   (i) Physical access.
7. Technology:
   (i) Change management;
   (ii) Problem management;
   (iii) Strategy; and
   (iv) Dependability FIG. 4 is an exemplary computer display showing the display of the subrisks, Business Resumption and Viruses 402A and 402B, identified in the preferred embodiment for the Business Resumption risk 401.

One or more control procedures for each sub-clement are then identified 204 and displayed to the user. In the preferred embodiment, these control procedures comprise:

Risk: 1. Business Continuity Subrisks:
  i. Business Resumption—Control Procedures:
    a. Change Management;
    b. Management Reporting;
    c. Off-site Recoverability;
    d. Test Performance; and
    e. Testing.
  ii. Viruses—Control Procedures:
    a. Anti-virus Software;
    b. Currency of Anti-virus Software;
    c. Scanning Practices; and
    d. Scope of Scanning.
2. Financial Subrisks:
  i. Expense Management—Control Procedures:
    a. Detailed budget;
    b. Expenditure vs. plan; and
    c. Expense Management Report.
3. Information Subrisks:
  i. Restoration—Control Procedures:
    a. Data back-up requirements;
    b. Media worthiness;
    c. Off-site storage;
    d. Back-up performances; and
    e. Back-up testing.
  ii. Security—Control Procedures:
    a. Security awareness;
    b. Data guardian;
    c. User ID administration;
    d. Rectification;
    e. User termination procedures;
    f. Violation monitoring;
    g. Dial-up access;
    h. Adherence to standards;
    i. Access approval process;
    j. Testing;
    k. User time-out; and
    l. Data encryption.
4. Legal/Regulatory Subrisks:
  i. Vendor Management—Control Procedures:
    a. Legal counsel;
    b. Escape clauses;
    c. Audit clauses;
    d. Adherence to policies;
    e. Point person established;
    f. Escalation process;
    g. Billing reconciliation; and
    h. Performance reporting.
  ii. Software Licensing—Control Procedures:
    a. Awareness;
    b. Software inventory;
    c. Documentation;
    d. Upgrade documentation;
    e. Compliance testing;

f. Invoices; and
g. Entitlements—market data access is assigned to users based on contractual agreements.
5. People Subrisks:
i. Capability—Control Procedures:
   a. Sourcing Strategy;
   b. Staff Retention;
   c. Succession Plans;
   d. Recruiting;
   e. Performance evaluations; and
   f. Attrition.
ii. Compliance Control Procedures:
   a. Diversity;
   b. Core Values;
   c. JPM work authorization;
   d. Adherence to policies; and
   e. Policy Review.
6. Physical Security Subrisks:
i. Capability Control Procedures:
   a. Location Security;
   b. Restricted Access;
   c. Recertification;
   d. Termination process;
   e. Environment controls; and
   f. Power supply.
7. Technology Subrisks:
i. Change Management Control Procedures:
   a. Documented Process;
   b. Process Compliance;
   c. Testing Changes;
   d. Business Communication;
   e. Change Integrity;
   f. Emergency Change Approval;
   g. Planning & Scheduling;
   h. Offsite Change Coordination;
   i. Back out;
   j. Segregation of Duties; and
   k. Business Impact.
ii. Problem management Control Procedures:
   a. Documented Process;
   b. Monitoring and Alerts;
   c. Help Desk;
   d. Problem reporting process;
   e. Trend Analysis; and
   f. Problem resolution.
iii. Strategy Control Procedures:
   a. Business Plans;
   b. Business Sponsorship;
   c. Strategy Alignment;
   d. Strategy Communication;
   e. Project Marketing;
   f. Service Level Agreements;
   g. Project Management; and
   h. Management Reporting.
iv. Dependability Control Procedures:
   a. Adherence Standards;
   b. Performance Monitoring;
   c. Service Level Agreements;
   d. Management Reporting;
   e. Capacity Planning;
   f. Hardware Reliability;
   g. Hardware Refresh;
   h. Software Currency;
   i. Level of business impact;
   j. Assets Inventory;
   k. Redundancy; and
   l. Y2K Compliance.

FIG. 4 shows the display of the control procedures 403A-403E for the Business Resumption subrisk 402A, The user is provided with a detailed description 404 of each control procedure by selecting one of the descriptive terms 403A-403E listed under the associated subrisk.

Each control procedure is assigned 205 a weight or control procedure priority ("CP-priority"). In the preferred embodiment, the following CP-priorities are used: very high=10, high=7, medium=4 and low=1. Each assigned CP-priority is stored in the rating database 105. Priorities for control procedures are preferably pre-set by an administrator.

The user is prompted to enter (see 405, FIG. 4) a compliance rating for each control procedure 206. In the preferred embodiment, these ratings comprise: green=full compliance, yellow=partial compliance, red=non-compliance, and blue not applicable. For each non-compliance or partial compliance control procedure, the user will be prompted 501 (FIG. 5) to determine 208 whether to enter an action plan or accept the risk. For each action plan created 209, the user will enter a description 502, target date 503 and additional comments 504. The user may also enter an estimated cost 505 and assign individuals 506 to the action plan.

In the preferred embodiment, each assessor also associates a number of additional parameters with each subrisk and/or control procedure. For example, the assessor may associate a process, city or region, or organization with each entry. Other parameters would be apparent in other applications. This associated data is stored in the rating database 106 and may be used for sorting and displaying as discussed below.

The compliance score is preferably based on cumulative weighting of two factors: the priority weight of each control procedure ("CP_weight") and the compliance or status factor ("CP_status_factor") for each such control procedure. In the preferred embodiment, this is calculated as:

Subrisk score equals:

$$\Sigma_{control\ procedures}((CP\_weight/\Sigma_{control\ procedures}(CP\_weight))*CP\_status\_factor)*10,$$ and the overall score equals the average of all the subrisk scores.

where:

$\Sigma_{control\ procedures}$ sums the control procedures for a given subrisk.

CP_weigh range from:

| Status | Weight |
|---|---|
| CP_weight ranges from: | |
| extremely high | scaleable (i.e. 10) |
| high | scaleable (i.e. 7) |
| medium | scaleable (i.e. 4) |
| low | scaleable (i.e. 1) |
| CP_status_factors range from: | |
| full compliance(green) | scaleable (i.e. 10) |
| partial compliance(yellow) | scaleable (i.e. 4) |
| non-compliance(red) | scaleable (i.e. 1) |
| not applicable (blue) | scaleable (i.e. 0) |

An example implementation of this scoring system is given in Table I below:

TABLE I

| CP Priority | CPP Weight |
|---|---|
| Extr. (EH) High | 1.8 |
| High (H) | 1.1 |
| Med. (M) | 1 |
| Low (L) | 0.5 |

| Status | Factor |
|---|---|
| Green (G) | 10 |
| Yellow (Y) | 6 |
| Red (R) | 2 |
| Blue (B) | 0 |

Scoring

| Subrisk | CP | Priority | Weight | Status | Status Factor | Weight % | Status Factor × Weight % |
|---|---|---|---|---|---|---|---|
| A | A | EH | 1.8 | G | 10 | 33% | 3.33 |
|   | B | H | 1.1 | R | 2 | 20% | 0.41 |
|   | C | M | 1 | Y | 6 | 19% | 1.11 |
|   | D | M | 1 | G | 10 | 19% | 1.85 |
|   | E | L | 0.5 | R | 2 | 9% | 0.19 |
|   | F | M | 0 | B | 0 |   | 6.89 |
|   | Total Weight | | 5.4 | | | 100% | add up scores 68.89 Total Score × 10 |
| B | G | EH | 1.8 | R | 2 | 46% | 0.92 |
|   | H | H | 1.1 | R | 2 | 28% | 0.56 |
|   | I | L | 0.5 | G | 10 | 13% | 1.28 |
|   | J | L | 0.5 | G | 10 | 13% | 1.28 |
|   | E | L | 0.5 | R | 2 | 9% | 0.19 |
|   | F | M | 0 | B | 0 |   | 4.05 |
|   | Total Weight | | 3.9 | | | 100% | add up scores 40.51 Total Score × 10 |
| C | K | EH | 1.8 | R | 2 | 32% | 0.63 |
|   | L | EH | 1.8 | G | 10 | 32% | 3.16 |
|   | M | EH | 0.5 | G | 10 | 9% | 0.88 |
|   | N | L | 0.5 | Y | 6 | 9% | 0.53 |
|   | O | M | 0 | B | 0 | 0% | 0.00 |
|   | P | M | 0 | B | 0 | 0% | 0.00 |
|   | Q | H | 1.1 | G | 10 | 19% | 1.93 |
|   | Total Weight | | 5.7 | | | 100% | 7.12 add up scores 71.23 Total Score × 10 |

| Overall Score | Score |
|---|---|
| Subrisk A | 68.89 |
| Subrisk B | 40.51 |
| Subrisk C | 71.23 |
| Total | 180.63 |
| Weight | Divide 180.6/360.21 by # of Subrisks (e.g. 3) |

Based on the target dates set in the action plans, the system may also option-ally calculate 210 future compliance scores. This allows assessors to easily deter-mine whether action plans are aggressive enough or unnecessarily aggressive. This also allows administrators to create a simple metric for determining how well groups perform in meeting their action plans.

Figure 6:
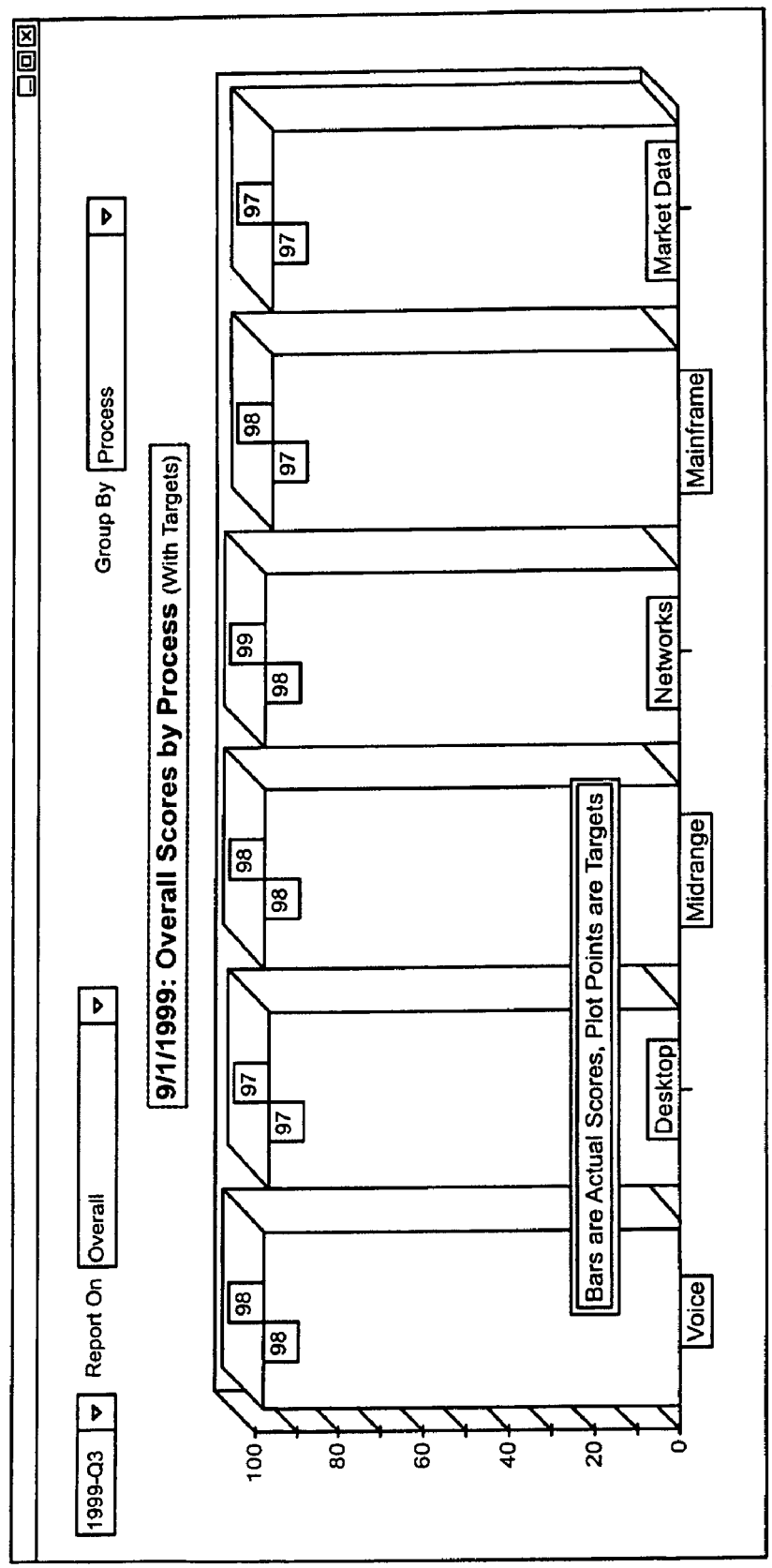
FIG. 6 is an exemplary computer display showing overall compliance scores sorted by business process.
Figure 7:
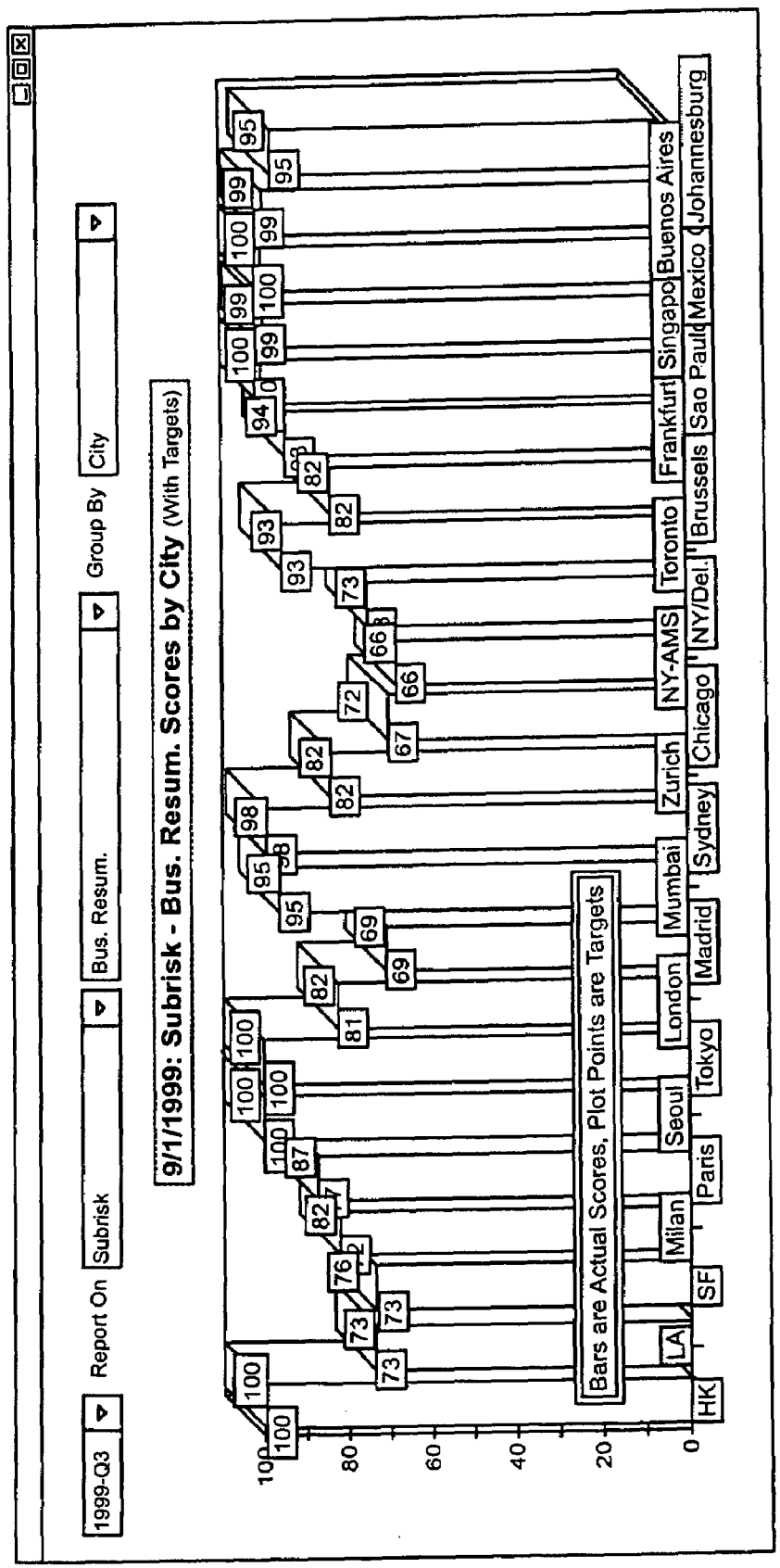
FIG. 7 is an exemplary computer display showing compliance scores for a specific subrisk sorted by city.

The novel system of weighing and categorizing risk of the present invention also facilitates the display of risk data in a number of ways which heretofore had not been possible. For example, compliance scores maybe sorted by process (e.g., voice, desktop, midrange, networks, mainframe, market data, etc.) and displayed as shown in FIG. 6. As a further example, FIG. 7 shows compliance scores for individual subrisks sorted by business location. Various other ways of sorting and displaying compliance scores will be apparent to those of skill in the art and include, for example, compliance scores for individual processes sorted by business organization, or compliance scores for individual business organizations sorted by business location. Such displays are extremely helpful to management in locating weak spots in risk compliance.

Figure 8:
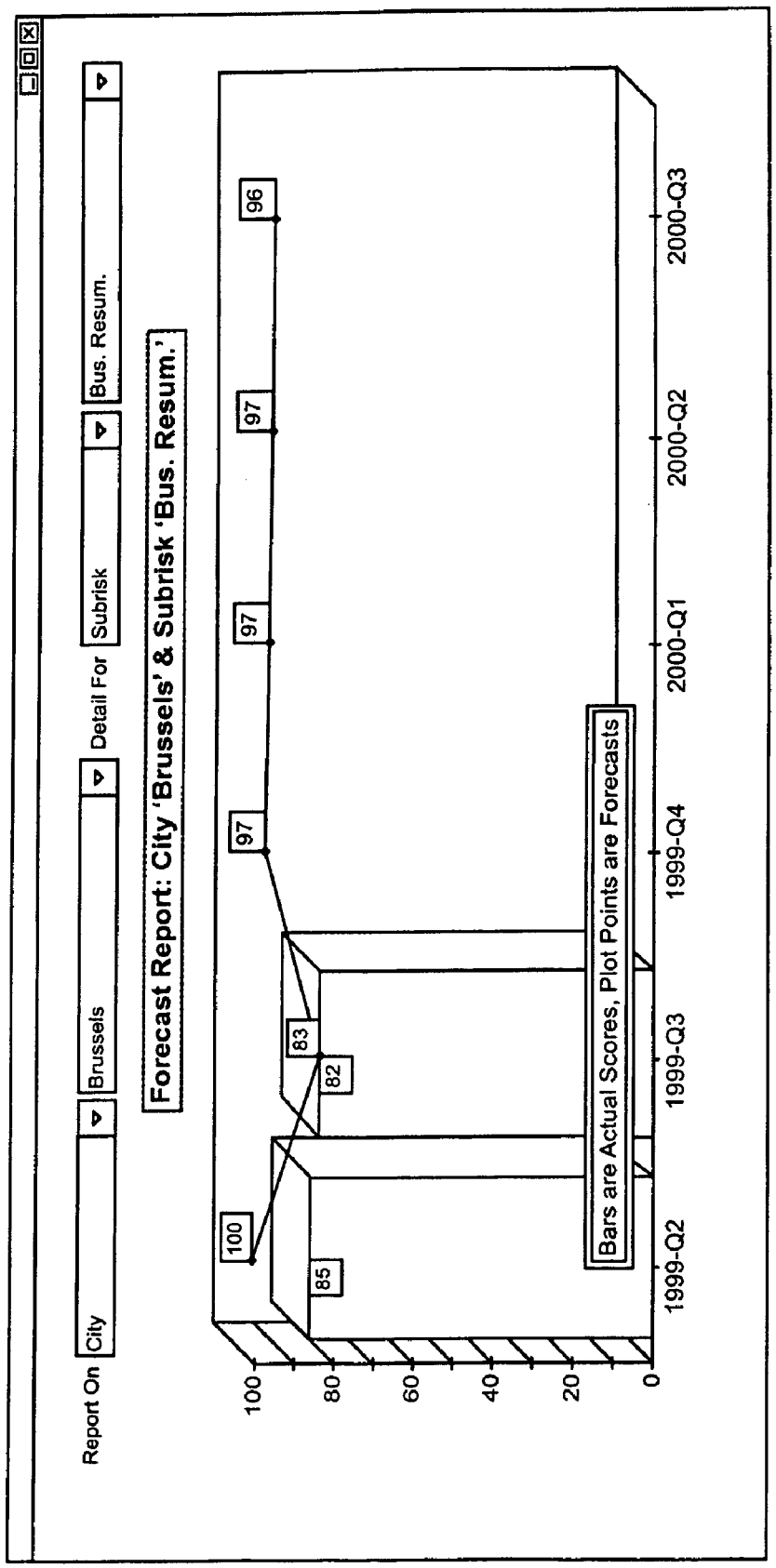
FIG. 8 is an exemplary computer display showing a forecast report sorted by city and subrisk.
Figure 9:
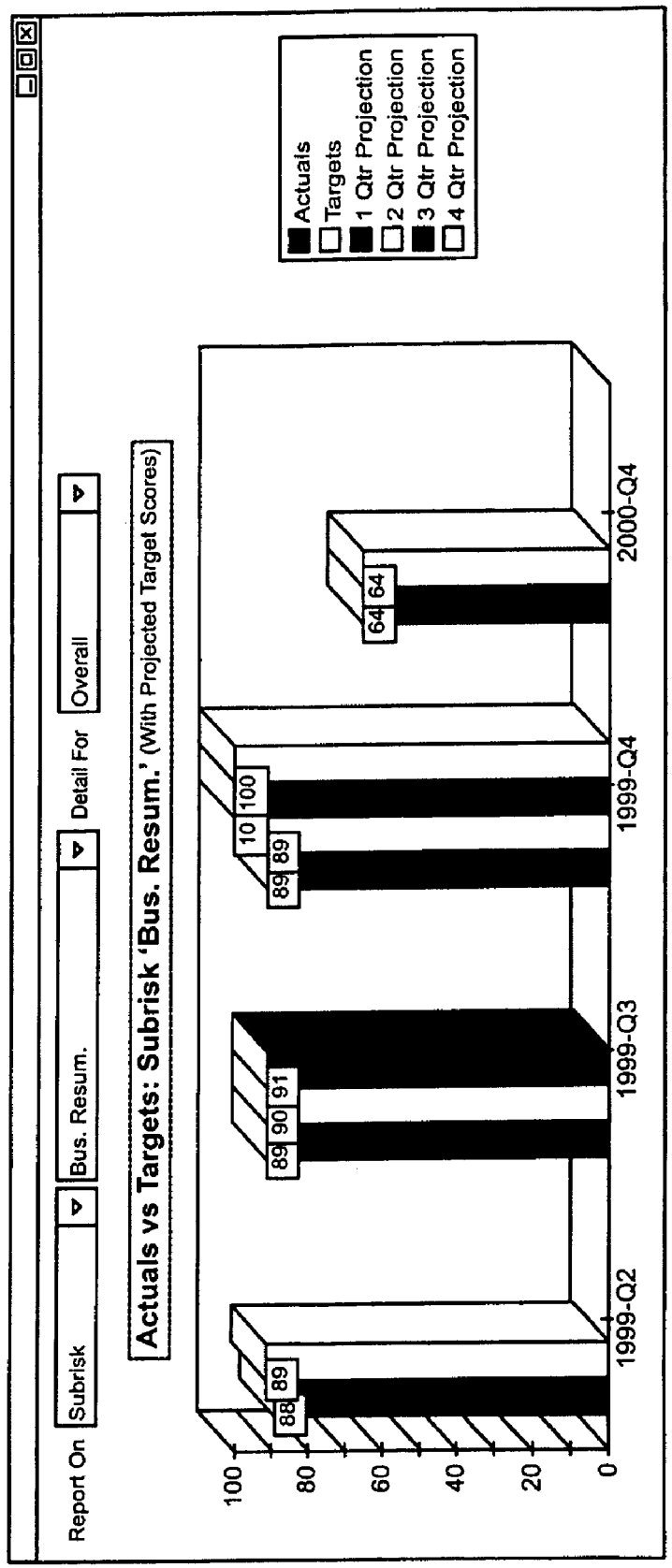
FIG. 9 is an exemplary computer display showing actual versus target compliance scores sorted by subrisk.

The system of the present invention also facilitates the ability to predict future levels of compliance and to teach entities ability to meet forecasts. Forecasts versus actual results may be sorted in any of a number of ways. FIG. 8 shows the forecast versus actual results for an individual city and individual subrisk. As shown in FIG. 9, actual versus target results may be sorted by subrisk and displayed.

Figure 10:
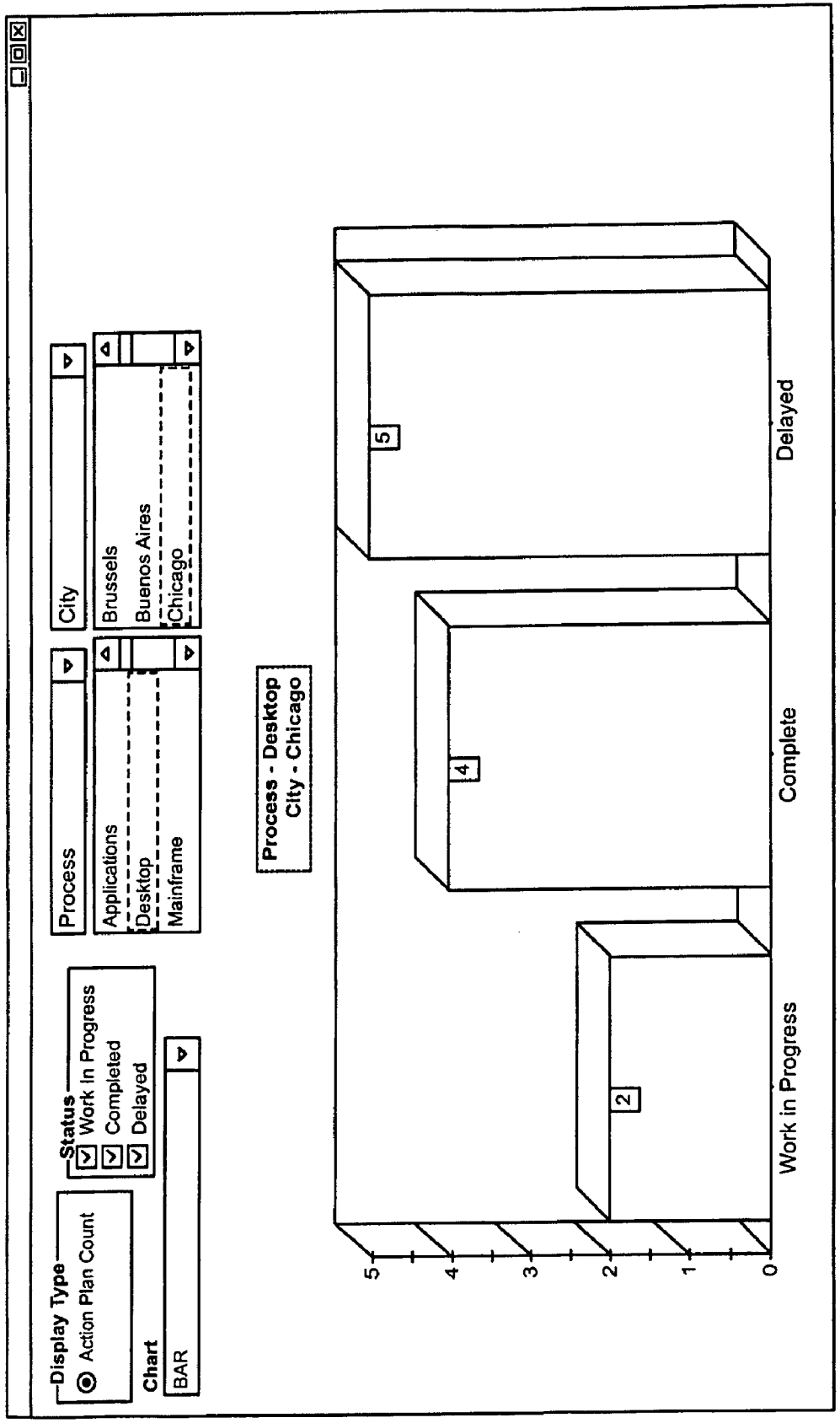
FIG. 10 is an exemplary computer display showing an action plan count sorted by process and city.

FIG. 10 shows an action plan status report for an individual process and individual city. Other reports made possible by the system of the present invention will be understood by those of skill in the art, and include, for example, views showing the number of compliant and non-compliant control procedures sorted by accessing organization.

Although the specification and illustrations of the invention contain many particulars, these should not be construed as limiting the scope of the invention but as merely providing an illustration of the preferred embodiments of the invention. For example, while the system is described in terms of risks and subrisks, it will be understood by those of ordinary skill in the art based on the specification herein that the method and system may be utilized using a single category of risks. Moreover, while the described system is described in terms of identifying one or more control procedures for each subrisk element, it will also be understood by those of ordinary slit] in the art, based on the specification herein, that the system may be designed to allow assessors to identify non-applicable subrisks in which case it would be unnecessary to identify control procedures for such subrisks. Thus, the claims should be construed as encompassing all features of patentable novelty that reside in the present invention, including all features that would be treated as equivalents by those skilled in the art.

What is claimed is:

1. A method for determining compliance with organizational business policies associated with a business risk, said method comprising:
   a. a computer, coupled to a server via a network, receiving a user selection of a business risk element from a business risk element list which is displayed to the user, said business risk element list being retrieved from a database coupled to said computer via said network;
   b. in response to the selection of said business risk element, the computer retrieving one or more predetermined control procedures, the control procedures identified by an administrator as a means for complying with business policies associated with said selected business risk element;
   c. the computer associating said one or more predetermined control procedures with said selected business risk element, said predetermined control procedures being stored in said database;
   d. in response to the retrieving of the control procedures, the computer retrieving a weight assigned to each one of said predetermined control procedures, said weight being stored in said database;
   e. the computer receiving a user selection of a compliance rating for each said predetermined control procedure, the rating selected by the user indicating a level of compliance with each one of said predetermined control procedures, for each of said predetermined control procedures the level of compliance is a subjective rating selected from a rigid set of compliance ratings, the same set of compliance ratings is available for each of said predetermined control procedures, wherein said compliance ratings comprise at least one rating identifying a non-fully compliant control procedures;
   f. the computer calculating a compliance score, said compliance score being a function of said assigned weights and said compliance rating of said predetermined control procedures;
   g. for each said control procedure having a non-fully compliant rating, the computer receiving a user generated signal indicating whether said non-fully compliant rating is accepted or not accepted; and
   h. for each said non-fully compliant control procedure which is indicated as not accepted, requiring the user to provide signals for generating an action plan.

2. The method of claim 1 wherein said action plan include a target date, said method further comprising the step of the computer calculating an expected compliance score for one or more future dates based on said action plan target dates.

3. The method of claim 2 further comprising the step of the computer tracking whether said expected compliance scores have been met, said tracking including calculating actual compliance scores for said target dates.

4. The method of claim 3 further comprising the step of the computer displaying said expected compliance scores versus said actual compliance for said target dates.

5. The method of claim 4 wherein said compliance score and said second compliance score are calculated at different points in time during a project.

6. A method for determining compliance with organizational business policies associated with a business risk, said method comprising:
   a. a computer receiving a user selection of a business risk element from a business risk element list which is displayed to a user on a display terminal of the computer, said business risk element list being retrieved from a database coupled to said computer;
   b. in response to the selection of said business risk element, the computer identifying one or more subrisk elements associated with said business risk element, each said subrisk element being retrieved from said database;
   c. for at least one subrisk element, the computer retrieving one or more predetermined control procedures, the control procedures identified by an administrator as a means for complying with business policies associated with said identified subrisk element;

d. the computer associating said one or more control procedures with said subrisk element, said control procedures being stored in said database;
e. the computer retrieving a weight assigned to each one of said predetermined control procedures, said weight being stored in said database;
f. the computer receiving a user selection of a compliance rating for each said predetermined control procedure, each said compliance rating is a subjective rating selected from a rigid predetermined set of compliance ratings, the same set of compliance ratings is available for each of said predetermined control procedures including at least one rating indicating said control procedure is not fully compliant;
g. the computer calculating a compliance score, said compliance score being a function of said assigned weights and said compliance rating of said control procedures;
h. for each said subrisk, the computer determining whether at least one control procedure associated with said subrisk is not fully compliant;
i. for each said subrisk associated with at least one control procedure which is not fully compliant, the computer receiving a signal from the user indicating whether said subrisk should be accepted or not accepted;
j. for each said subrisk which is indicated as not accepted, the computer generating an action plan;
k. receiving a user selection of a business risk element from a business risk element list; and
l. in response to the selection of said business risk element, the computer presenting a sorted list of business risk elements including the selected business risk element.

7. The method of claim 6 wherein said sorted list contains business risk elements from multiple projects.

8. A data processing system for determining compliance with organizational business policies associated with a business risk, said system comprising:
a. a database;
b. a processor coupled to said database, said processor being programmed to perform the steps comprising:
   i. the computer receiving a first signal identifying a user selection of a set of business risk elements from a business risk element list which is displayed to a user, said business risk elements being stored in said database;
   ii. the computer receiving a second signal identifying a user selection of one or more control procedures associated with each said business risk element, said control procedure comprising a means for complying with business policies associated with said risk elements, said control procedures being stored in said database;
   iii. the computer receiving a third signal assigning a weight to each said control procedure, said weight being stored said database;
   iv. the computer receiving a fourth signal identifying a user selection of a compliance rating for each said control procedure, for each of said predetermined control procedures the compliance rating is selected from a rigid set of compliance ratings, the same set of compliance ratings is available for each of said predetermined control procedures wherein said compliance ratings comprise at least one rating identifying a non-fully compliant control procedure;
   v. the computer calculating a compliance score, said compliance score being a function of said assigned weights and said compliance rating of said control procedures;
   vi. for each said control procedure having a non-fully compliant rating, the computer receiving a signal indicating whether said non-fully compliant rating is accepted or not accepted;
   vii. for each said non-fully compliant control procedure which is indicated as not accepted, the computer receiving an action plan, said action plan including an expected target date for implementation and an expected compliance rating;
   viii. the computer generating one or more future expected compliance scores for a future date, said compliance scores being a function of said target dates, said assigned weights and said expected compliance rating of said control procedures; and
   ix. the computer calculating a second compliance score at said future date, said second compliance score being a function of said assigned weights and said compliance rating of said control procedures at said future date.

9. The method of claim 8 wherein said action plan further includes a target date, said method further comprising the step of the computer calculating a future compliance score based on said action plan target dates.

10. The system of claim 9 further comprising the step of the computer sorting said compliance ratings and displaying said sorted ratings.

11. The system of claim 8 further comprising the step of the computer associating one or more parameters with each said compliance rating.

12. A method of forecasting compliance with organizational business policies associated with a business risk with the aid of a computer system, said method comprising:
a. the computer identifying a set of business risk elements, said business risk elements being stored in a database coupled to said computer;
b. for at least one of said business risk elements, the computer retrieving one or more predetermined control procedures, the control procedures identified by an administrator as a means for complying with business policies associated with said business risk element;
c. the computer associating said one or more control procedures with said business risk element;
d. the computer retrieving a weight assigned to each one of said predetermined control procedures, said weight being stored in said database;
e. the computer receiving a user selection of a compliance rating for each said predetermined control procedure, said compliance ratings are subjective ratings chosen from a predetermined rigid set of ratings over a uniform range, the same set of compliance ratings is available for each of said predetermined control procedures, including at least one rating identifying a non-fully compliant control procedure and at least one rating identifying fully compliant control procedures;
f. for each said control procedure having a non-fully compliant rating, the user employing the computer to generate an action plan, said action plan including a target date for at least one action listed therein; and g. the computer calculating an expected compliance score for a future date, said expected compliance score being a function of said assigned weights, said fully compliant control procedures, and said action plan target dates for said non-fully compliant control procedures;

h. the computer calculating a second compliance score at said future date, said second compliance score being a function of said assigned weights and said compliance rating of said control procedures at said future date.

13. The method of claim 12 wherein said compliance score and said second compliance score are calculated at different points in time during a project.

\* \* \* \* \*